United States Patent
Kimura et al.

(10) Patent No.: US 7,776,950 B2
(45) Date of Patent: Aug. 17, 2010

(54) ANTIVIBRATION RUBBER COMPOSITION

(75) Inventors: Norihito Kimura, Kasugai (JP);
Toyohisa Tohyama, Toyoake (JP);
Takehiko Taguchi, Nagoya (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 12/057,436

(22) Filed: Mar. 28, 2008

(65) Prior Publication Data

US 2008/0242792 A1 Oct. 2, 2008

(30) Foreign Application Priority Data

Mar. 28, 2007 (JP) ............................. 2007-084923

(51) Int. Cl.
*B60C 1/00* (2006.01)
*C08F 36/00* (2006.01)
(52) U.S. Cl. ....................................... 524/492; 526/335
(58) Field of Classification Search ................. 524/492; 526/335
See application file for complete search history.

(56) References Cited

U.S. PATENT DOCUMENTS

| 5,804,644 | A | 9/1998 | Nakafutami et al. |
| 6,927,244 | B2 | 8/2005 | Kimura et al. |
| 2005/0282951 | A1 * | 12/2005 | Esch et al. ............ 524/493 |

FOREIGN PATENT DOCUMENTS

| EP | 0580370 | A1 | | 1/1994 |
| EP | 0647591 | A1 | | 4/1995 |
| EP | 1 364 989 | A1 | * | 11/2003 |
| EP | 1364989 | A1 | | 11/2003 |
| JP | 3233458 | B2 | | 11/2001 |
| JP | 2004-168885 | A | | 6/2004 |
| JP | 2006-199899 | A | | 3/2006 |
| JP | 2006-169281 | A | | 6/2006 |

OTHER PUBLICATIONS

European Search Report dated Jul. 31, 2008, issued in corresponding European Patent Application No. 08005680.7.

* cited by examiner

*Primary Examiner*—William K Cheung
(74) *Attorney, Agent, or Firm*—Westerman, Hattori, Daniels & Adrian, LLP

(57) ABSTRACT

An antivibration rubber composition containing diene rubber (Component A) and silica (Component B). The amount of the Component B contained is set to a range from 10 to 100 parts by weight with respect to 100 parts by weight of the Component A. The Component B has the following properties, i.e., a surface silanol-group density of not less than 3.0 groups/nm$^2$ as determined by the Sears titration method, an average particle size of not more than 10 μm, and a BET specific surface area of 15 to 60 m$^2$/g.

4 Claims, No Drawings

ANTIVIBRATION RUBBER COMPOSITION

BACKGROUND OF THE INVENTION

1. Field of the Invention

The present invention relates to an antivibration rubber composition and particularly to an antivibration rubber composition used for engine mounts intended for supporting a car engine and suppressing the transmission of vibration

2. Description of the Related Art

In general, an antivibration rubber composition is used for cars for the purpose of reducing vibration and/or noise. The antivibration rubber composition needs to have high stiffness and high strength and also needs to suppress the transmission of vibration. Hence, the value of dynamic magnification (dynamic spring constant (Kd)/static spring constant (Ks)) needs to be small (reduction of dynamic magnification). Conventionally, in order for the reduction of dynamic magnification, for example, carbon black has been used as a reinforcing material and the factors thereof such as the amount, particle size and structure have been controlled. This, however, has been insufficient for the reduction of dynamic magnification. Therefore, such antivibration rubber compositions have been proposed that contain silica instead of carbon black serving as a reinforcing material and therefore have lower dynamic magnification as compared to those containing carbon black (for example, Japanese Patent No. 3233458 and Japanese Unexamined Patent Application Publication No. 2004-168885). Further, from the viewpoint that silica having a large primary particle size (a small BET specific surface area) is effective in the reduction of dynamic magnification, such an antivibration rubber has been proposed that contains 100 parts by weight of a rubber component principally containing natural rubber and 20 to 80 parts by weight of silica having a BET specific surface area of 25 to 100 $m^2/g$ and a $\Delta$ thermogravimetric reduction of 3.0% or more, the $\Delta$ thermogravimetric reduction being defined as a difference between the thermogravimetric reduction at 1,000° C. and the thermogravimetric reduction at 150° C. in thermogravimetric measurement (Japanese Unexamined Patent Application Publication No. 2006_199899).

The antivibration rubber composition disclosed in the Japanese Unexamined Patent Application Publication No. 2006-199899 contains silica having a large primary particle size and therefore is effective in achieving lower dynamic magnification as compared to one containing ordinary silica. The use of silica having a large primary particle size leads to a reduction in the interaction between such silica and rubber, posing a problem in that a rubber vibration isolator has low durability. As described above, there is no antivibration rubber composition having a good balance between durability and low dynamic magnification at present. Therefore, and antivibration rubber composition having a good balance between durability and low dynamic magnification is being demanded.

SUMMARY OF THE INVENTION

The present invention has been made in view of the foregoing circumstances. It is an object of the present invention to provide an antivibration rubber composition effective in achieving a good balance between durability and low dynamic magnification.

In order to achieve the above object, an antivibration rubber composition according to the present invention contains the following components:

(A) diene rubber; and
(B) silica.

The amount of the Component (B) contained is set to a range from 10 to 100 parts by weight with respect to 100 parts by weight of the Component (A). The Component (B) has all the following properties: ($\alpha$) a surface silanol-group density of not less than 3.0 groups/$nm^2$ as determined by the Sears titration method; ($\beta$) an average particle size of not more than 10 µm; and ($\gamma$) a BET specific surface area of 15 to 60 $m^2/g$.

The inventors have made intensive investigation to obtain an antivibration rubber composition effective in achieving high durability and low dynamic magnification. As a result, the inventors have found that a rubber composition prepared by compounding specific silica with diene rubber (Component (A)) at a specific ratio is effective in achieving the object. The specific silica has surface silanol groups bonded to a silane coupling agent and reacting with the diene rubber (Compound A). The specific silica also has a surface silanol-group density of not less than 3.0 groups/$nm^2$ as determined by the Sears titration method, an average particle size of not more than 10 µm, and a BET specific surface area of 15 to 60 $m^2/g$.

As described above, the antivibration rubber composition according to the present invention contains the specific silica at a specific ratio with respect to the diene rubber, the specific silica having a surface silanol-group density of not less than 3.0 groups/nmas determined by the Sears titration method, an average particle size of not more than 10 µm, and a BET specific surface area of 15 to 60 $m^2/g$. As a result, the antivibration rubber composition is effective in achieving high durability and low dynamic magnification.

DESCRIPTION OF THE PREFERRED EMBODIMENTS

Embodiments of the present invention will now be described in detail.

An antivibration rubber composition according to the present invention can be achieved by compounding diene rubber (Component (A)) and specific silica (Component B)) at a predetermined ratio.

The present invention has its greatest characteristic in that the specific silica (Component (B)) has all the properties ($\alpha$), ($\beta$), and ($\gamma$) numerated below.

($\alpha$) A surface silanol-group density of not less than 3.0 groups/$nm^2$ as determined by the Sears titration method.
($\beta$) An average particle size of not more than 10 µm.
($\gamma$) A BET specific surface area of 15 to 60 $m^2/g$.

The diene rubber (Component (A)) is not particularly limited and examples thereof include natural rubber (NR), isoprene rubber (IR), butadiene rubber (BR), styrene-butadiene rubber (SBR), acrylonitrile-butadiene rubber (NBR), and ethylene-propylene diene rubber (EPDM). These are used alone or in combination. In particular, natural rubber is preferably used because of its strength and low dynamic magnification.

The amount of the specific silica (Component (B)), which is used in combination with the diene rubber (Component (A)), needs be set to a range from 10 to 100 parts by weight (hereinafter simply referred to as "parts ") with respect to 100 parts of the diene rubber (Component (A)), preferably a range from 10 to 80 parts. That is, when the amount of the specific silica (Component (B)) is less than 10 parts, properties thereof are seriously lowered. In contrast, when the amount thereof exceeds 100 parts, dynamic magnification increases, and/or when the silica amount is excessively large, the silica itself serves as a foreign substance, thereby threatening to lower that properties.

The specific silica (Component (B)) needs to have all the properties (α), (β), and (γ) below.

(α) A surface silanol-group density of not less than 3.0 groups/nm² as determined by the Sears titration method.

(β) An average particle size of not more than 10 μm.

(γ) A BET specific surface area of 15 to 60 m²/g.

First, the property (α) will now be described. The surface silanol-group density determined by the Sears titration method is not less than 3.0 groups/nm², preferably in the range from 3 to 30 groups/nm². That is, when the silanol-group density is less than 3.0 groups/nm², the reactivity (bondability) of the specific silica with a silane coupling agent and the diene rubber (the Component (A)) is lowered, and the durability thereof is lowered. Hence, the specific silica does not sufficiently react with the silane coupling agent and/or the diene rubber (Component (A)), lowering the rubber properties thereof.

Herein, the surface silanol-group density was calculated from the Sears titer determined by a method disclosed in G. W. Sears, Analytical Chemistry, vol. 28, No. 12, 1956, pp. 1982-1983. In the calculation of the silanol-group density, the relationship between the Sears titer and the number of silanol groups was assumed to derive from the ion exchange reaction below.

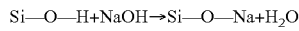

Si—O—H+NaOH→Si—O—Na+H₂O

Examples of the method for determining the silanol-group density include the Sears titration method, a thermogravimetric (TG) method, and the like. In the thereof is counted as the low of —OH groups. Counted by this method are the —OH groups present in inner portions of primary particles and micro-portions of aggregates of silica having no interaction with rubber. On the other hand, the determination of the silanol-group density by the Sears titration method is a technique for counting only those —OH groups present in the surface of the silica aggregates. In consideration of the distribution of silica in the rubber and the boding of silica to the rubber, it is certain that the silanol-group density determined by the Sears titration method is more suitable to express an approximately actual state. Next, the property (β) will be described. The average particle size is not more than 10 μm, preferably in a range from 2 to 10 μm. When the average particle size exceeds 10 μm, agglomerates tend to be large and silica itself serves as a foreign substance. Hence, the properties are lowered and/or the dynamic magnification increases because of the agglomeration of silica.

The average particle size used herein is an average particle size as determined by the Coulter method.

Next, Property (γ) will be described. The BET specific surface area is within a range from 15 to 60 m²/g, preferably within a range from 15 to 35 m²/g. When the BET specific surface area is less than 15 m²/g, the size of primary particles increases excessively and the contact area between each primary particle and the diene rubber (the Component (A)) decreases. As a result, a sufficient reinforcing effect cannot be obtained, and tensile strength at break (TSb) and/or elongation at break (Eb) are rendered unsatisfactory. In contrast, when the BET specific surface area is excessively large, i.e. exceeding 60 m²/g, the size of the primary particles decreases excessively and therefore the primary particles agglomerate so strongly as to render the dispersion of the primary particle poor and the dynamic properties unsatisfactory.

The BET specific surface area may be determined by a nitrogen adsorption method using gaseous nitrogen as an adsorbate.

A method for preparing the specific silica (Component (B)) is not particularly limited as far as an ordinary precipitation method is used. For example, the specific silica may be prepared by neutralizing an aqueous alkali silicate solution (a commercially available aqueous sodium silicate solution) with a mineral acid and allowing silica to precipitate. The usable method may be a method in which a predetermined amount of an aqueous sodium silicate solution with a predetermined concentration is charges into a reaction vessel and mineral acid is added to this solution under predetermined conditions (single addition reaction), or a method in which sodium silicate and mineral acid are added into a reaction vessel charged with a predetermined amount of hot water for a predetermined time while the pH and temperature of this solution are being controlled (simultaneous addition method). A precipitated silica slurry prepared by one of the above methods is filtered with a filtration system (for example, a filter press or a belt filter) and then washed, whereby by-product electrolytes are removed. The obtained silica cake is dried with a known dryer. In general, the silica cake is converted into slurry, which is then dried with a spray dryer, but may be dried in a heating oven in the state of a cake. The drying method is not particularly limited. With a pulverizer, the dried silica cake is subsequently pulverized into particles having a predetermined average size. As need arises, coarse particles are removed from the particles with a classifier. Thus, the specific silica is prepared. The purpose of the pulverizing operation is to adjust the average size of the particles, and the purpose of the classifying operation is to remove the coarse particles. A pulverizing system (for example, a jet mill or an impact mill) is not particularly limited. As for the classifier, the classifying method (for example, a pneumatic method or a screening method) is not particularly limited.

The antivibration rubber composition of the present invention may further contain a vulcanizer, a vulcanization accelerator, a vulcanization aid, an anti-aging agent. process oil, a silane coupling agent, and the like in addition to the diene rubber (Component (A)) and the specific silica (Component (B)) as required. The antivibration rubber composition of the present invention contains the specific silica (Component (B)) instead of carbon black which has conventionally been used as a reinforcing material. The antivibration rubber composition preferably contains substantially no carbon black functioning as a reinforcing material (no carbon black contained but may contain carbon black if the amount thereof is insufficient to affect the properties specified herein.

Examples of the vulcanizer include sulfur (powdery sulfur, precipitated sulfur, and insoluble sulfur) and the like. These are used alone or in combination.

The amount of the vulcanizer contained is preferably within a range from 0.3 to 7 parts, and more preferably within a range from 1 to 5 parts with respect to 100 parts of the diene rubber (Component (A)). When the amount of the vulcanizer is excessively small, a sufficient number of crosslinking bonds cannot be obtained and the dynamic magnification and sag resistance ten to be lower. In contrast, when the amount the vulcanizer is excessively large, heat resistance tends to be lower.

The vulcanizer accelerator is not particularly limited. Examples of the vulcanizer accelerator include thiazole-, sufenamide-, thiuram-, aldehyde/ammonia-, aldehyde/amine-, guanidine-, and thiourea-based vulcanization accelerators. These accelerators are used alone or in combination.

In particular, a sufenamide-based vulcanization accelerator is preferably used because of the high crosslinking reactivity thereof.

The amount of the vulcanization accelerator contained is preferably within a range from 0.5 to 7 parts, and more preferably 0.5 to 5 parts with respect to 100 parts of the diene rubber (Component (A)).

Examples of the thiazole-based vulcanization accelerators include dibenzothiazyl disulfide (MTBS), 2-mercaptobenzothiazole (MBT) is preferably used because of the high crosslinking reactivity thereof.

Examples of the sulfenaminde-based vulcanization accelerators include N-oxydiethylene-2-benzothiazolyl sulfenamide (NBOS), N-cyclohexyl-2-benzothiazolyl sulfenamide (CBS), N-t-butyl-2-benzothiazolyl sulfenamide (BBS), and N,N'-dicyclohexyl-2benzothiazolyl sufenamide.

Examples of the thiuram-based vulcanization accelerators include tetramethylthiuram disulfide (TMTD), tetramethylthiuram disulfide (TETD), tetrabutylthiuram disulfide (TBTD), tetrakis(2-ethylhexyl)thiuram disulfide (TOT), and tetrabenzylthiuram disulfide (TBzTD).

The vulcanization aid is not particularly limited. Examples of the vulcanization aid include zinc oxide (ZnO), stearic acid, and magnesium oxide,. These are used alone or in combination.

The amount of the vulcanization aid contained is preferably within a range from 1 to 25 parts, and more preferably 3 to 10 parts with respect to 100 parts of the diene rubber (Component (A)).

Examples of the anti-aging agent include a carbamate-based anti-aging agent, a phenylene diamine-based anti-aging agent, a phenol-based anti-aging, a diphenylamine-based anti-aging agent, a quinoline-based anti-aging agent, an imidazole-based anti-aging agent, and wax. These are used alone or in combination.

The amount of the anti-aging agent contained is preferably within a range from 1 to 10 parts, and more preferably 2 to 5 parts with respect to 100 parts of the diene rubber (Component (A)).

Examples of the process oil include naphthenic oil, paraffinic oil, and aromatic oil. These are used alone or in combination.

The amount of the process oil contained is preferably within a range from 1 to 50 parts, and more preferably 3 to 30 parts with respect to 100 parts of the diene rubber (Component (A)).

The silane coupling agent preferably has a function of increasing the affinity between the diene rubber (Component (A)) and the specific silica (Component (B)). Examples of the silane coupling agent include a sulfur-containing silane coupling agent, a mercaptosilane coupling agent, a vinylsilane coupling agent, and aminosilane coupling agent, an epoxy silane coupling agent, a methacryloxy silane coupling agent, a chlorosilane coupling agent, and a phenylsilane coupling agent. These are used alone or in combination.

The amount of the silane coupling agent contained is preferably within a range from 0.5 to 10 parts and more preferably 1 to 5 parts with respect to 100 parts of the diene rubber (Component (A)).

The antivibration rubber composition of the present invention is prepared, for example, as described below. The diene rubber (Component (A)) and the specific silica (Component (B)) are appropriately mixed together and further mixed with the vulcanization aid, the anti-aging agent, and/or the process oil as required. These materials are first kneaded at about 50° C. and further kneaded at 100° C. to 130° C. for 3 to 5 minutes with Banbury mixer or the like. The vulcanizer and the vulcanization accelerator are approximately added to this mixture. These materials are kneaded with an open roll under predetermined conditions (for example, at 50° C. for 4 minutes), whereby the antivibration rubber composition is prepared. The obtained antivibration rubber composition is vulcanized at high temperature (150° C. to 170° C.) for 5 to 30 minutes, whereby a target rubber vibration isolator is obtained.

The antivibration rubber composition of the present invention is suitable for, for example, vibration isolators such as engine mounts, stabilizer bushings, and suspension bushings, respectively for use in vehicles such as cars.

EXAMPLES

Examples will no be described in conjunction with comparative examples. It should be noted that the present invention is not limited to the examples.

Example 1

The following materials were compounded, kneaded first at about 50° C., and then further kneaded at a maximum temperature (150° C.) for 4 minutes with a Banbury mixer: 100 parts of natural rubber that was a diene rubber (a Component (A)), 5 parts of zinc oxide, 1 part of stearic acid, 2 parts of an anti-aging agent, 2 parts of wax, 5 parts of mineral oil, 2 parts of a silane coupling agent, and 20 parts of silica (Silica A) having properties shown in Table 1 below. the resulting compound was mixed with 2 parts of a vulcanization accelerator (CBS), 1 part of another vulcanization accelerator (TMTD), and 1 part of vulcanizer (sulfur). The mixture was kneaded at about 50° C. for 4 minutes with an open roll, whereby an antivibration rubber composition was prepared.

Examples 2 and 8 and Comparative 1 to 8

Antivibration rubber compositions were prepared in substantially the same manner as in Example 1 except that the amount of each component contained was varied, as shown in Tables 1 and 2.

TABLE 1

|  | Examples | | | | | | | | (parts by weight) |
| --- | --- | --- | --- | --- | --- | --- | --- | --- | --- |
|  | 1 | 2 | 3 | 4 | 5 | 6 | 7 | 8 | |
| Natural rubber | 100 | 100 | 100 | 100 | 100 | 100 | 100 | 100 | |
| Zinc oxide | 5 | 5 | 5 | 5 | 5 | 5 | 5 | 5 | |
| Stearic acid | 1 | 1 | 1 | 1 | 1 | 1 | 1 | 1 | |
| Anti-aging agent | 2 | 2 | 2 | 2 | 2 | 2 | 2 | 2 | |
| Wax | 2 | 2 | 2 | 2 | 2 | 2 | 2 | 2 | |
| Mineral oil | 5 | 5 | 5 | 5 | 5 | 5 | 5 | 5 | |

TABLE 1-continued (parts by weight)

|  |  | Examples | | | | | | | |
|---|---|---|---|---|---|---|---|---|---|
|  |  | 1 | 2 | 3 | 4 | 5 | 6 | 7 | 8 |
| (Naphthenic oil) | | | | | | | | | |
| Silane coupling agent | | 2 | 2 | 2 | 2 | 2 | 2 | 1 | 5 |
| Silica | | 20 | 20 | 20 | 20 | 20 | 20 | 10 | 100 |
| Type | | A | B | C | D | E | F | D | D |
| Silanol group density (groups/nm$^2$) | | 3.2 | 7.5 | 10.1 | 14.4 | 10.1 | 10.1 | 14.4 | 14.4 |
| Average particle size (μm) | | 3.7 | 5 | 9.2 | 5 | 3.6 | 2 | 5 | 5 |
| BET specific surface area (m$^2$/g) | | 60 | 29 | 18 | 15 | 18 | 18 | 15 | 15 |
| Vulcanization accelerator (CBS) | | 2 | 2 | 2 | 2 | 2 | 2 | 2 | 2 |
| Vulcanization accelerator (TMTD) | | 1 | 1 | 1 | 1 | 1 | 1 | 1 | 1 |
| Vulcanizer (sulfur) | | 1 | 1 | 1 | 1 | 1 | 1 | 1 | 1 |
| Initial properties | TSb (MPa) | 26.2 | 24.0 | 20.5 | 20.0 | 21.6 | 22.0 | 18.2 | 19.0 |
|  | Eb (%) | 550 | 530 | 560 | 550 | 560 | 560 | 600 | 310 |
|  | Hardness (JIS A) | 54 | 53 | 53 | 53 | 53 | 53 | 52 | 65 |
| Permanent compression strain | | 45 | 44 | 42 | 42 | 42 | 42 | 41 | 49 |
| Dynamic properties | Ks (N/mm) | 413 | 421 | 408 | 411 | 413 | 408 | 312 | 858 |
|  | Kd100 (N/mm) | 538 | 541 | 508 | 516 | 520 | 510 | 365 | 1690 |
|  | Kd100/Ks | 1.30 | 1.29 | 1.25 | 1.26 | 1.26 | 1.25 | 1.17 | 1.97 |

TABLE 2

(parts by weight)

|  |  | Comparative Examples | | | | | | | |
|---|---|---|---|---|---|---|---|---|---|
|  |  | 1 | 2 | 3 | 4 | 5 | 6 | 7 | 8 |
| Natural rubber | | 100 | 100 | 100 | 100 | 100 | 100 | 100 | 100 |
| Zinc oxide | | 5 | 5 | 5 | 5 | 5 | 5 | 5 | 5 |
| Stearic acid | | 1 | 1 | 1 | 1 | 1 | 1 | 1 | 1 |
| Anti-aging agent | | 2 | 2 | 2 | 2 | 2 | 2 | 2 | 2 |
| Wax | | 2 | 2 | 2 | 2 | 2 | 2 | 2 | 2 |
| Mineral oil (Naphthenic oil) | | 5 | 5 | 5 | 5 | 5 | 5 | 5 | 5 |
| Silane coupling agent | | 2 | 2 | 2 | 2 | 2 | 0.5 | 5.5 | 2 |
| Silica | | 20 | 20 | 20 | 20 | 20 | 5 | 110 | 20 |
| Type | | a | b | c | d | e | D | D | f |
| Silanol group density (groups/nm$^2$) | | 2.6 | 2.4 | 2.9 | 14.4 | 2.4 | 14.4 | 14.4 | 29.5 |
| Average particle size (μm) | | 20 | 12 | 3.4 | 12.6 | 5.5 | 5 | 5 | 3.2 |
| BET specific surface area (m$^2$/g) | | 210 | 92 | 86 | 15 | 16 | 15 | 15 | 10 |
| Vulcanization accelerator (CBS) | | 2 | 2 | 2 | 2 | 2 | 2 | 2 | 2 |
| Vulcanization accelerator (TMTD) | | 1 | 1 | 1 | 1 | 1 | 1 | 1 | 1 |
| Vulcanizer (sulfur) | | 1 | 1 | 1 | 1 | 1 | 1 | 1 | 1 |
| Initial properties | TSb (MPa) | 28.4 | 26.5 | 25.0 | 18.0 | 18.0 | 16.2 | 16.9 | 17.8 |
|  | Eb (%) | 670 | 610 | 560 | 500 | 560 | 580 | 270 | 510 |
|  | Hardness (JIS A) | 58 | 57 | 55 | 52 | 52 | 51 | 66 | 50 |
| Permanent compression strain | | 49 | 47 | 45 | 43 | 46 | 41 | 50 | 43 |
| Dynamic properties | Ks (N/mm) | 453 | 435 | 422 | 382 | 410 | 298 | 868 | 358 |
|  | Kd100 (N/mm) | 685 | 645 | 600 | 488 | 540 | 345 | 1778 | 432 |
|  | Kd100/Ks | 1.51 | 1.48 | 1.42 | 1.28 | 1.32 | 1.16 | 2.05 | 1.21 |

The materials shown in Table 1 and 2 are as numerated below.

Zinc Oxide
Two types of zinc oxide available from Sakai Chemical Industry Co., Ltd.

Stearic Acid
LUNAC S30 available from Kao Corporation

Anti-aging Agent
OZONONE 6C available from Seiko Chemical Co., Ltd.

Wax
SUNNOC available from Ouchishinko Chemical Industrial Co., Ltd.

Mineral Oil
Naphthenic oil (DIANA PROCESS OIL NM-280 available from Idemitsu Kosan Co., Ltd.

Silane Coupling Agent
Sulfur-containing silane coupling agent (Si75 available from Degussa)

Silica A to F and a to f
Prototype products prepared to have a predetermined surface silanol-group density as determined by the Sears titration method, a predetermined average particle size, and a predetermined BET specific surface area.

Vulcanized Accelerator
CBS (NOCCELER available from Ouchishinko Chemical Industrial Co., Ltd.)

Vulcanized Accelerator

TMTD (SANCELER TT available from Sanshin Chemical Industry Co., Ltd.)

Vulcanizer

Sulfur (powdery sulfur available from Tsurumi Chemical Co., Ltd.)

The antivibration rubber composition of each of the examples and the comparative examples was evaluated for various properties according to the following standards. The evaluation results were shown in Tables 1 and 2.

Initial Properties

Each antivibration rubber composition was press-formed at 160° C. for 20 minutes and then vulcanized, whereby a rubber sheet with a thickness of 2 mm was prepared. The rubber sheet was punched into JIS No. 5 dumbbells. The dumbbells were measured for tensile strength at break (Tsb) and elongation at break (Eb) according to JIS K 6251 as well as for hardness (JIS A).

Permanent Compression Strain

Each antivibration rubber composition was press-formed at 160° C. for 30 minutes, whereby a test piece was prepared. According to JIS K 6262, the test piece was heated at 100° C. for 70 hours while the test piece was being compressed by 25%. The resulting test piece was measured for permanent compression strain.

Dynamic Properties (Static Spring Constant: Ks)

Each antivibration rubber composition was processed into a rubber piece having a diameter of 50 mm and a height of 25 mm, and disk-shaped fittings having a diameter of 60 mm and a thickness of 6 mm were pressed against the upper and lower surfaces of the rubber piece under the vulcanization conditions at 170° C. for 30 minutes. By this, this disk-shaped fittings and the rubber piece were vulcanization-bonded to each other, whereby a test piece was prepared. This test piece was compressed by 7 mm in the cylinder axis direction. The static spring constant (Ks) was determined by calculation based on the load at a strain of 1.5 mm and the load at a strain of 3.5 mm respectively read from the second compression load-strain curve.

(Dynamic Spring Constant: Kd100)

The test piece was compressed by 2.5 mm in the cylinder axis direction. Vibration due to constant-deformation harmonic compression having an amplitude of 0.05 mm was applied upwardly to the center of the test piece compressed by 2.5 mm at a frequently of 100 Hz. The dynamic load was detected with an upper load cell, from which a dynamic spring constant (Kd100) was calculated according to JIS K 6394.

(Dynamic Magnification: Kd100/Ks)

Dynamic magnification was determined as a value obtained from the following formula:

(dynamic spring constant (Kd100))/(static spring constant (Ks)).

According to the results shown in Tables 1 and 2, the products of the Examples that contain the specific silica having a surface silanol-group density of not less than 3.0 groups/$nm^2$ as determined by the Sears titration method, an average particle size of not more than 10 μm, and a BET specific surface area of 15 to 60 $m^2/g$ had satisfactory initial properties, permanent compression strain, and dynamic properties. In contrast, the products of Comparative Examples 1 and 2 respectively containing Silica a or b having a surface silanol-group density of less than 3.0 groups/$nm^2$, an average particle size exceeding 10 μm, and an excessively large BET specific surface area (exceeding 60 $m^2/g$) had unsatisfactory permanent compression strain and dynamic properties. The product of Comparative Example 3 containing Silica c having a surface silanol-group density of less than 3.0 groups/$nm^2$ and an excessively large BET specific surface area had unsatisfactory dynamic properties. The product of Comparative Example 4 containing Silica d having an average particle size exceeding 10 μm had unsatisfactory tensile strength at break (Tsb) and unsatisfactory elongation at break (Eb). The product of Comparative Example 5 containing Silica e having a surface silanol-group density of less than 3.0 groups/$nm^2$ had unsatisfactory tensile strength at break (Tsb) and unsatisfactory dynamic properties. The product of Comparative Example 6 containing Silica D in an amount of less than the lower limit had unsatisfactory tensile strength at break (Tsb) because of the excessively small amount of the silica which serves as reinforcing material. The product of Comparative Example 7 containing Silica D in an amount exceeding the upper limit had unsatisfactory tensile strength at break (Tsb), unsatisfactory elongation at break (Eb), high harness, and unsatisfactory permanent compression strain, because the amount of the silica contained is excessively large to that the silica itself serves as foreign substance. The product of Comparative Example 8 containing Silica f having an excessively small BET specific surface area of less than 15 $m^2/g$ had unsatisfactory tensile strength at break (Tsb) and elongation at break (Eb).

The antivibration rubber composition according to the present invention in suitable as material for vibration isolators of engine mounts, stabilizer bushings, and suspension bushings, respectively for use in vehicles including cars.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to determined by the following claims.

What is claimed is:

1. An antivibration rubber composition for automobiles containing:
    (A) diene rubber;
    (B) silica; and
    (C) sulfur,
    wherein
    the Component (A) is at least one selected from a group consisting of natural rubber (NR), isoprene rubber (IR), butadiene rubber (BR), styrene-butadiene rubber (SBR) and acrylonitrile-butadiene rubber (NBR),
    the amount of the Component (B) contained is set to a range from 10 to 80 parts by weight with respect to 100 parts by weight of the Component (A),
    the Component (B) has the following properties:
    (α) a surface silanol-group density of not less than 3.0 groups/$nm^2$ as determined by the Sears titration method,
    (β) an average particle size of 2 to 10 μm as determined by the Coulter method, and
    (γ) a BET specific surface area of 15 to 29 $m^2/g$, and the Component (C) is contained as a vulcanizer.

2. An antivibration rubber composition for automobiles as set forth in claim 1, wherein the amount of sulfur contained is within a range from 0.3 to 7 parts by weight with respect to 100 parts by weight of the Component (A).

3. An antivibration rubber composition for automobiles as set forth in claim 1, wherein the surface silanol-group density determined by the Sears titration method ($\alpha$) is within the range from 3.0 to 30 groups/nm$^2$.

4. An antivibration rubber composition for automobiles as set forth in claim 1, wherein the rubber composition is suitable for engine mounts, stabilizer bushings or suspension bushings respectively for use in vehicles including cars.

* * * * *